MULTIPLE-INPUT MEMORY ACCESSING APPARATUS

Filed Dec. 16, 1963 4 Sheets-Sheet 1

INVENTOR
GEORGE F. STEIGERWALT JR.

BY [signature]

ATTORNEY

Jan. 17, 1967 G. F. STEIGERWALT, JR 3,299,261
MULTIPLE-INPUT MEMORY ACCESSING APPARATUS
Filed Dec. 16, 1963 4 Sheets-Sheet 2
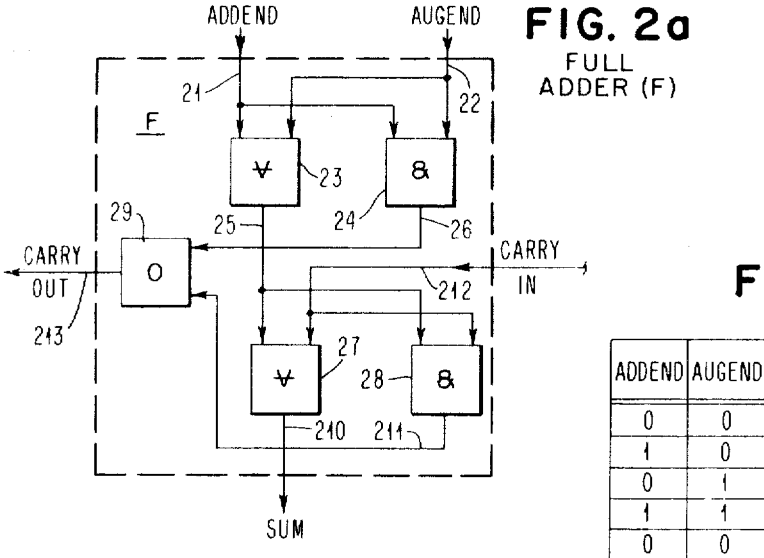
FIG. 2a
FULL ADDER (F)
FIG. 2b
TABLE
| ADDEND | AUGEND | CARRY IN | SUM | CARRY OUT |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |
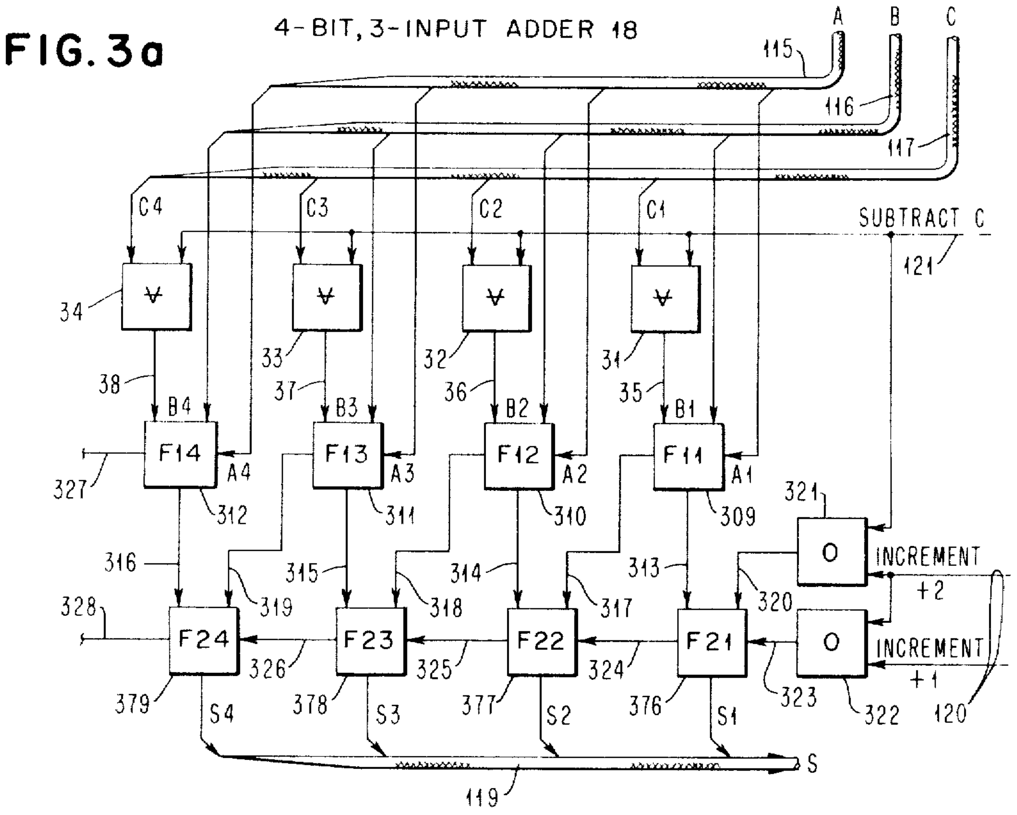
FIG. 3a
4-BIT, 3-INPUT ADDER 18

Jan. 17, 1967 G. F. STEIGERWALT, JR 3,299,261

MULTIPLE-INPUT MEMORY ACCESSING APPARATUS

Filed Dec. 16, 1963 4 Sheets-Sheet 4

M-BIT, N-INPUT ADDER 18

3,299,261
Patented Jan. 17, 1967

3,299,261

MULTIPLE-INPUT MEMORY ACCESSING APPARATUS

George F. Steigerwalt, Jr., Troy, N.Y., assignor to International Business Machines Corporation, New York, N.Y., a corporation of New York Filed Dec. 16, 1963, Ser. No. 330,841
2 Claims. (Cl. 235—175)

Figure 1A:
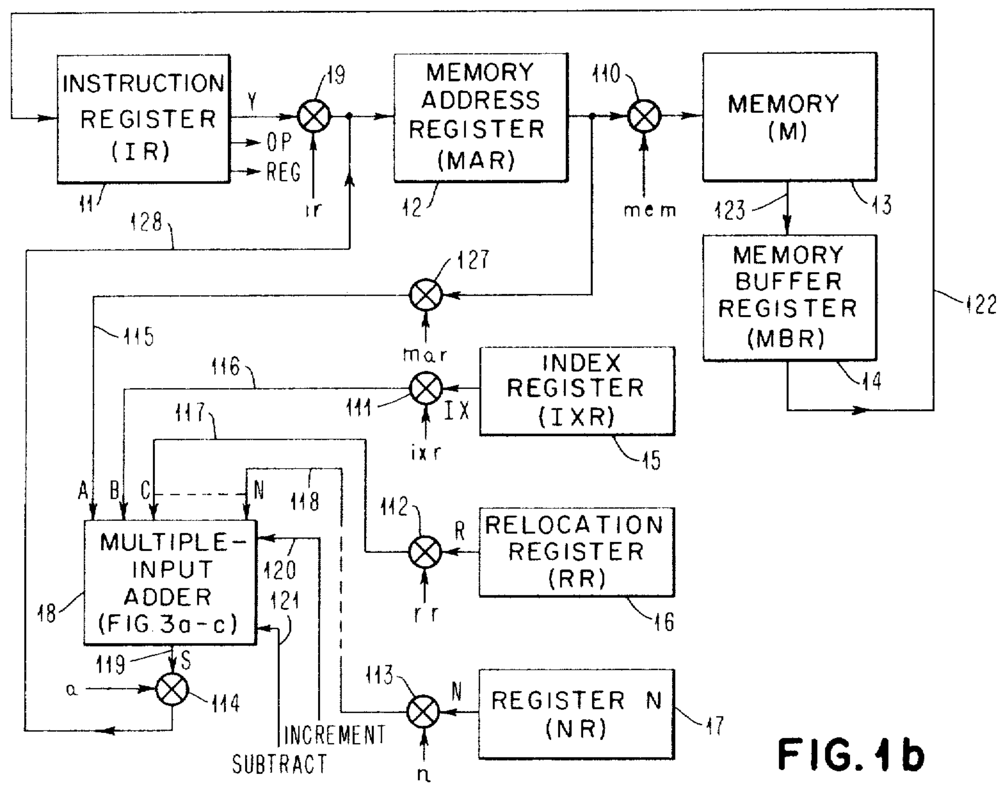

This invention relates to electronic apparatus. More particularly, this invention relates to memory accessing circuits, in electronic data processing systems, which rapidly perform multiple arithmetic operations.

Electronic data processing systems operate in accordance with stored programs of instructions, each instruction usually operating upon data in a specified location in a memory. An address part of each instruction specifies a location at which memory holds data to be operated upon. By modifying the instruction address part, a single instruction may repeatedly operate upon data held in different memory locations.

In address modification, as is well known, a modification quantity is combined with the instruction address part to form an effective address specifying where data to be operated upon is located in memory. Indexing, a type of address modification, forms the effective address by combining the contents of an instruction-specified index register with the instruction address part.

Double indexing combines two modification quantities with the address part of an instruction to form the effective address at which will be found data to be operated upon in accordance with operations specified by the instruction. For example, the effective address may be created by combining a modification quantity from an index register and a relocation quantity from a relocation register with the instruction address part. Occasionally, more than two modification quantities (sometimes as many as five or six) are combined with an instruction address prior to accessing data from a memory.

Multiple indexing has in the prior art been performed by multiple addition operations. For example in double indexing, the modification quantity from the index register is added to the relocation register contents in one adder, the resulting sum being then added to the instruction address part in a second adder. For each additional modifier, an additional addition circuit must be provided, greatly increasing the time necessary to process an instruction prior to accessing memory since each addition must be completely performed before the next addition starts. The major time-consuming operation in addition is normally the position-by-position rippling of interstage carries, each position's sum and carry output awaiting the previous position's carry. Since only a short time is available to access a cyclically operated memory once an instruction is available, multiple adding operations may be completed so late in the memory's cycle that an additional memory cycle is required.

In the prior art, there have been many attempts to increase multiple indexing speed. Thus multiple adders, each increasing processing time, may be replaced by bistable arithmetic stages having interstage "carry" ripples during a final addition operation only; as opposed to multiple adders which require interstage carry ripples for each addition operation. Though this advantageously completes all additions during the last addition, bistable circuits are inherently slow and expensive. Another approach has been the design of multiple input carry-predict adders without any interstage carries, the carries for each stage being predicted simultaneously for use by a single set of simultaneously operating adder stages; a very expensive solution to the problem. A less expensive approach is a logic adder with carry-save storage which adds without accounting for carries ("saved" in a storage), until a special operation combines the saved carries with the result in the adder (or in an additional carry-predict adder).

Further, it is often necessary to subtract one of the modification quantities instead of adding it, or to increment or decrement the effective address by a fixed quantity prior to use; operations not conveniently performed by any of the prior art devices described.

It is therefore an object of this invention to provide improved memory accessing apparatus.

Another object is to provide improved memory address modification apparatus.

Still another object of this invention is to provide inexpensive apparatus for accessing memory as a function of multiple modifiers and addresses.

A still further object is to provide apparatus for performing multiple indexing during a limited period of time.

Another object of this invention is to provide improved multiple-input memory accessing apparatus that efficiently adds and subtracts selected inputs and increments and decrements resultant sums.

The foregoing and other objects, features and advantages of the invention will be apparent from the following more particular description of the preferred embodiments of the invention, as illustrated in the accompanying drawings.

These objects are achieved in an electronic data processing apparatus wherein instructions and data are stored as binary words in a memory having addressable locations. After an instruction is accessed from the memory, only a limited period is available before the instruction address part is used to access memory for data in the next memory cycle. The instruction address part must be modified in accordance with several binary modification quantities during this limited period if the data processing system is to operate efficiently. Therefore, since the period is too short for successive complete additions of the address and the modification quantities, a multiple-input adder is provided. The adder forms the effective address by taking the binary sum of its binary input operands, which are in this case the instruction address part and the modifiers.

The multiple input adder provided, includes a matrix of full adder stages, each full adder having two binary operand inputs and a carry input and also a binary sum output and carry output. The full adders are arranged into levels, each level having a number of full adders equal to the number of bits in the binary operands supplied to the adder. The number of levels is one less than the number of binary operands supplied to the adder. The first level adds three binary input operands to form, for each bit position, a sum and output carry. Each position in each of the successive levels, except the last level, combines the corresponding sum and the adjacent output carry from the previous level with a bit of an additional input operand. Each position of the last level combines the corresponding sum and adjacent output carry from the previous level with the output carry from the adjacent position in the same level; the delays inherent in ripple carry techniques thus being confined to only one level.

By controlling input carry signals to the first bit positions of selected levels, incrementing and subtracting operations may be conveniently preformed.

In the figures:

FIGURE 1*a* is a block diagram illustrating an electronic data processing system utilizing the invention.

Figure 1B:
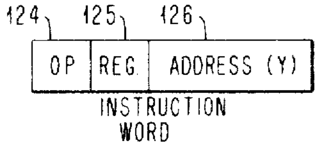

FIGURE 1*b* is a diagram showing a typical instruction word format.

Figure 1C:
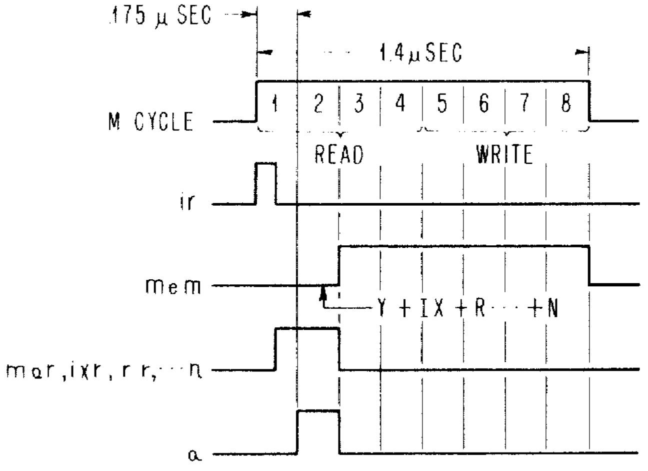

FIGURE 1*c* is a wave form diagram showing signals present at specified points in FIGURE 1*a*.

FIGURE 2*a* is a logic diagram illustrating one possible embodiment of a full adder used in the invention.

FIGURE 2*b* is a table illustrating the operation of the full adder shown in FIGURE 2*a*.

FIGURE 3*a* is a logic diagram showing a first embodiment of an adder usable in the invention.

Figure 3B:
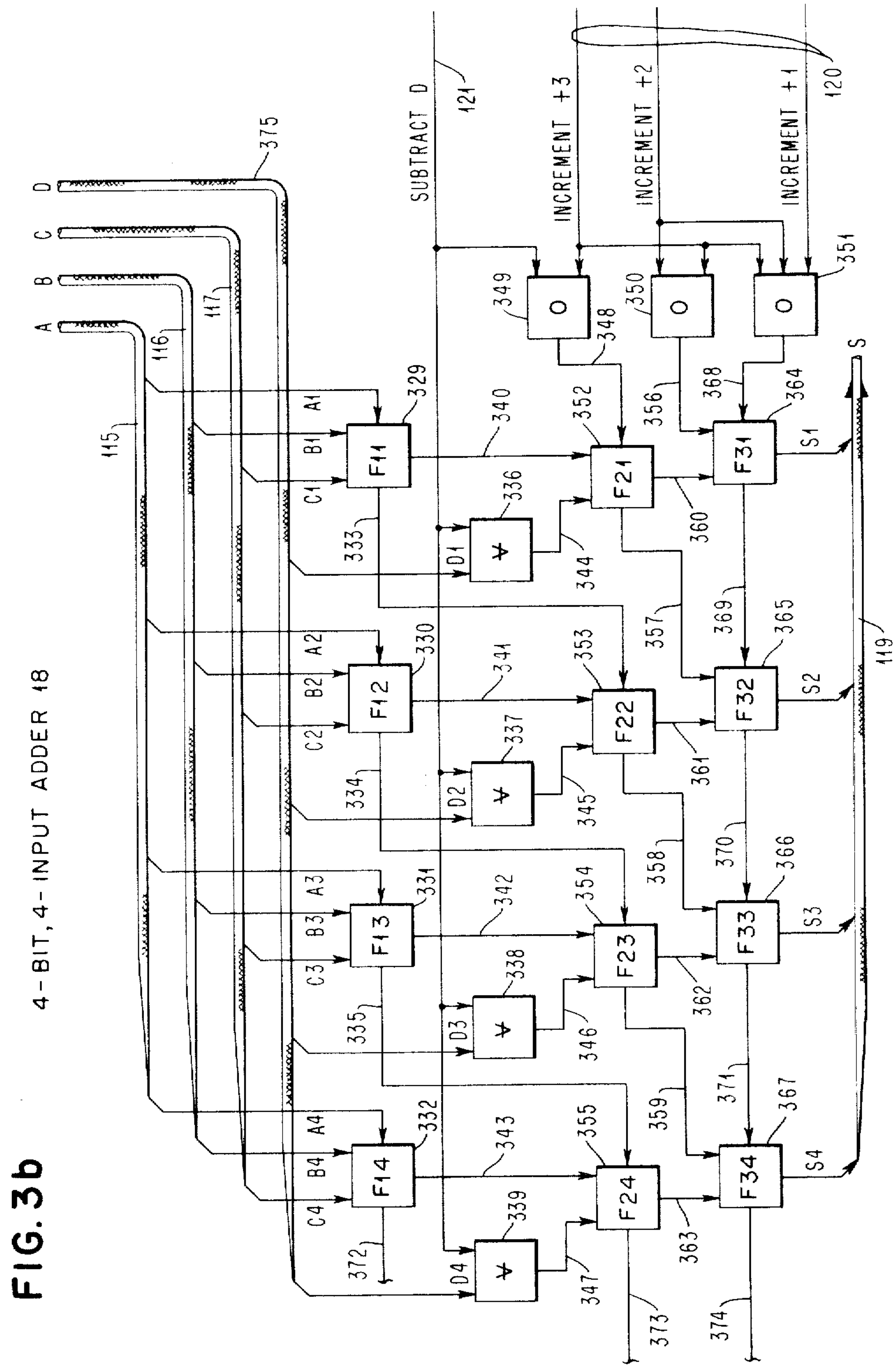

FIGURE 3*b* is a logic diagram showing a second embodiment of an adder usable in the invention.

Figure 3C:
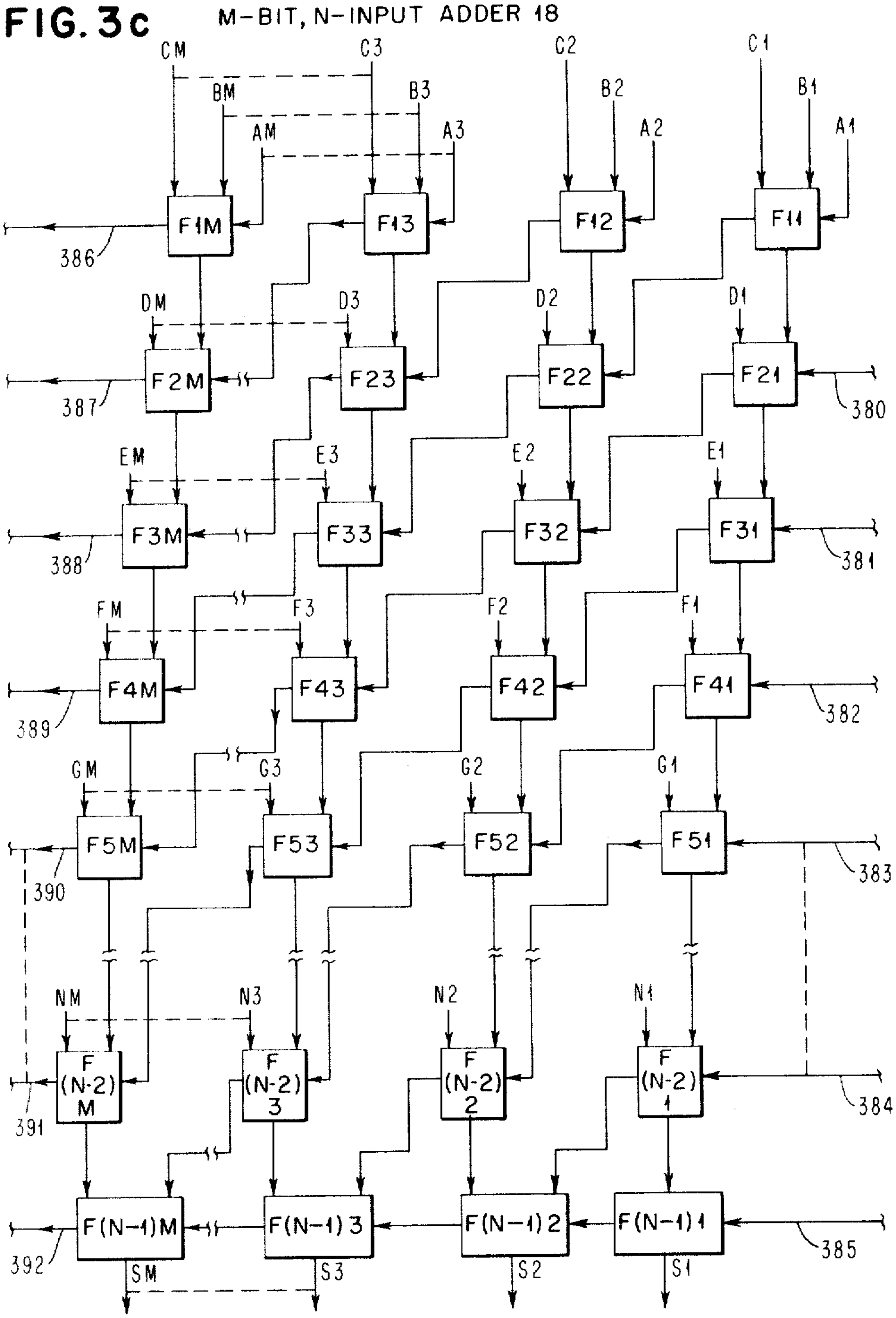

FIGURE 3*c* is a logic diagram generally illustrating the principle of adders usable in the invention.

ADDRESS MODIFICATION (FIG. 1)

Referring to FIGURE 1*a*, the block diagram shows a cyclically operative electronic data processing system utilizing the invention. The system operates upon data words and instruction words, each comprising a plurality of parallel binary bits, in any well known manner, for example as described in U.S. Patent 3,036,773, Indirect Addressing in an Electronic Data Processing Machine, of J. L. Brown et al., assigned to the International Business Machines Corp., which patent is incorporated herein by this reference. For the purpose of describing the invention, only essential portions of the electronic data processing system are shown in FIGURE 1*a*.

As shown in FIGURE 1*b*, a typical instruction word includes at least an operation part 124, a register designation part 125 and an address part 126, though instruction words often have additional parts such as control tags and additional designation and address parts. As is well known, the operation part 124 designates an operation to be performed upon data located in a memory location determined by an address Y specified by the address part 126 as modified by information contained in one or more registers designated by register part 125.

FIGURE 1*a* will be generally described first. A memory address register 12 initially specifies the location of a binary instruction word in memory 13, which instruction is subsequently accessed from the memory 13 and placed into a memory buffer register 14. The instruction in the memory buffer register 14 is transferred to an instruction register 11 from where the address Y in the instruction is placed into the memory address register 12. Since the entire system operates in fixed cycles, only a predetermined interval remains between the time that the address Y is placed into the memory address register 12 and the time the memory 13 utilizes this address (as modified in the manner to be described) to access the location of a data word. During this interval, a multiple input (A, B, C, etc. through N) adder 18 combines the address Y held in the memory address 12 with the contents of modification registers, for example: index register 15 contents IX, relocation register 16 contents R and other registers including a last register 17 which contains N, to provide a modified effective address $(Y+IX+R\ .\ .\ .\ +N)$ for replacing the address Y previously stored in the memeory address register 12. The modified effective address thereafter accesses a location in memory 13 to provide a binary data word to memory buffer register 14.

FIGURE 1*a* will now be described in more detail.

The memory 13 used in the particular example shown in FIGURE 1*a* is a three-dimensional core array providing one binary data or instruction word in parallel on a cabled line 123 for each address received via a gate 110. Obviously, equivalent memories such as drums, disks, delay lines, cathode-ray stores, ferro-electric stores, etc. may be provided.

The memory buffer register 14 receives data words and instruction words accessed from locations in the memory 13 via cabled line 123. The memory buffer register, when used in conjunction with a core array, usually returns information, read from its associated memory, normally destroyed during accessing operations. The memory buffer register 14, though typically constructed of flip-flop stages for each bit of the binary information in a memory (data or instruction) word, may be built from equivalent components such as latches, delay lines, magnetic cores, etc.

The memory address register 12 provides addresses of specified locations in memory 13; it initially holds the address of an instruction in the memory 13. Subsequently, the memory address register 12 receives the addressed instruction's address part which, when modified, is replaced by the effective address used to access a data word from memory 13. Though the memory address register 12 may be similar in construction to The memory address register 12 provides addresses of the memory buffer register 14, it most often uses feedback latches (with or without delay-type storage).

The instruction register 11 receives instruction words on line 122 from the memory buffer register 14, sending the operation part 124 to control circuits (not shown), the register designation part 125 to register selection circuits (not shown) and the address part 126 to the memory address register 12, in the manner described, for instance, in the referenced Patent 3,036,773.

Index register 15, relocation register 16, similar registers (not shown) and last (N) register 17 may each contain modification quantities selectable for use in forming an effective address from an instruction address part. Each of these registers may be constructed in the manner of the other registers previously described, though it is not necessary that all registers be identical.

The multiple input (A, B, C etc. through N) adder 18 receives instruction address parts from the memory address register 12 and modifiers from selected ones of the index register 15, the relocation register 16, the additional registers (not shown) and the last register 17. An effective address is formed at binary sum (S) output 119 as a function of all selected inputs. The adder 18 output is also effected by increment signals on line 120 to add a fixed value to the sum formed by the adder 18 prior to its application to line 119. Further, signals on subtract line 121 cause one, or more, of the inputs to be subtracted instead of added to the adder 18.

Gates 19, 110 111, 112, 113, 114 and 127 control the sequence in which information is transferred among the units forming the electronic data processing system of FIGURE 1*a*. A gate operates to pass a signal when a control signal samples the gate. For example, the memory address register 12 contents are gated to the multiple adder 18 through gate 127 when a sampling signal *mar* is applied to gate 127.

Referring to FIGURE 1*c*, the sequence of gate operations is shown for a typical memory cycle. As an illustration, the memory performs a read/write cycle (a read operation followed by a write operation) every 1.4 microseconds. For the memory to read information from a location, it is essential that the memory address register 12 supplies a location address to the memory immediately following the first two portions, of eight .175 microsecond portions, of a memory cycle; that is, immediately following the first .350 microsecond of the memory cycle. If multiple indexing operations are not completed within .350 microsecond, the desired location cannot be accessed until the next cycle.

In FIGURES 1*a* and 1*c*, during the first part of a memory cycle a signal *ir* operates gate 19 to transfer the address Y from a current instruction to the memory address register 12. Thereafter during the balance of the first part, and the entire second part of the cycle, desired ones of signals *mar*, *ixr*, *rr*, etc. through *n* operate corresponding gates 127, 111, 112, additional gates (not shown) and last gate 113 to select and transfer modifiers IX, R, etc. through N to the multiple adder 18. During the second part of the memory cycle, a signal "*a*" samples gate 114 to transfer the outputs of the multiple input adder 18 to the memory address register 12. Though signal "*a*" begins after .175 microsecond, the modified effective address (sum of the instruction address part, index quantity, relocation quantity, etc.) will not, in the worst case, be available from the adder 18 on cabled line 119 until late during the second part of the memory cycle. During the third part, and all subsequent parts, of the memory cycle, a signal *mem* samples gate 110 to specify to memory 13 the modified effective address $(Y+IX+R \cdot \cdot \cdot +N)$ in the memory address register 12, thus accessing (reading and writing) a data word at the specified memory location.

COMPONENTS

Standard well-known logic circuit designations used in describing the logic diagrams of FIGURES 2 and 3, will now be briefly described.

Exclusive OR circuits, shown by blocks labeled ∀, provide a 1-bit output whenever the inputs are different; that is there will be a 0-bit output if the inputs are the same. OR circuits, shown by blocks labeled O, have a 1-bit output if there is a 1-bit at either input or at both inputs. AND circuits, shown by blocks labeled &, have a 1-bit output only if both inputs are 1-bits. Full adders, shown by blocks labeled F, provide at sum and carry output lines the binary sum of two operand inputs and a carry input.

FIGURE 2*a* is a logic diagram of a typical full adder circuit, other full adder circuits being described, for example, in R. K. Richards "Arithmetic Operations in Digital Computers" (Van Nostrand 1955). An addend bit and augend bit are combined with an input carry bit to form binary sum and output carry bits in accordance with the rules of binary addition summarized in the FIGURE 2*b* table. The addend bit is supplied on line 21 and the augend bit is supplied on line 22 to a first half adder comprising an Exclusive OR circuit 23 and an AND circuit 24. The output (half sum) on line 25 from the Exclusive OR circuit 23 is applied together with an input carry bit on line 212 to a second half adder comprising Exclusive OR circuit 27 and AND circuit 28. The output on line 210 of the Exclusive OR circuit 27 forms the desired binary sum while the desired carry output is supplied to line 213 by OR circuit 29 as a function of partial carries on lines 26 and 211 from the half adders.

MULTIPLE-INPUT ADDER (FIG. 3)

*4-Bit, 3-Input Adder.*—Referring to FIGURE 3*a* one embodiment of a novel multiple-input adder usable in the inventive combination is illustrated.

Three operands A, B and C, each comprising four binary bits, supplied on cables 115, 116 and 117 are added to form a 4-bit sum S on cable 119. This adder can: add the three operands, add two operands while subtracting a third, increment by two while adding, or increment by one while adding or subtracting.

Full adders are designated by level and bit position, for example F23 is in the second level, third position. Operand A (representing a 4-bit instruction address part) is supplied directly from cable 115 to the first level of full adders 309, 310, 311 and 312. Operand B (a 4-bit index modifier) is supplied directly from cable 116 to the same full adders, while operand C (a 4-bit relocation modifier) is supplied from cable 117 to these full adders indirectly through corresponding ones of Exclusive OR circuits 31, 32, 33 and 34.

As long as there is a 0-bit on subtract C line 121, the Exclusive OR circuits 31, 32, 33 and 34 will pass the operand C from cable 117 to the full adders 309, 310, 311 and 312 without change. However, if there is a 1-bit on the subtract C line 121, the Exclusive OR circuits 31, 32, 33 and 34 will invert (1's complement) every bit supplied on cable 117 prior to transfer to the corresponding full adders. Subsequent addition of one into the low order adder position F21, as will be described, forms the 2's complement of operand C. Addition of the true forms of operands A and B and the 2's complement of operand C causes algebraic addition of plus A, plus B and minus C; that is, C is subtracted instead of added. Obviously, the Exclusive OR circuits may be associated with another operand, or additional circuits may be provided for other operands, to permit subtraction of any, or all, operands—for example, two operands can be subtracted from a third.

The first level full adders 309, 310, 311 and 312 are connected to a second level of full adders 376, 377, 378 and 379. The first level sum outputs 313, 314, 315 and 316 are each connected to inputs of second level full adders 376, 377, 378 and 379 in corresponding positions, while the first level carry outputs 317, 318 and 319 are connected to inputs of second level full adders 377, 378 and 379 in adjacent positions. Lines 324, 325 and 326, interconnecting full adders 376, 377, 378 and 379, ripple carries from full adders 376, 377 and 378 to full adders 377, 378 and 379 respectively. The carry output 327 of full adder 312 and the carry output 328 of full adder 379 are not used in this particular example.

The increment lines 120 supply one extra 1-bit input to full adder 376 on the increment +1 line and two extra 1-bit inputs to full adder 376 on the increment +2 line. Full adder 376 receives, on input line 320 from OR circuit 321, a 1-bit from the subtract C line 121 during subtraction to convert the operand C from the 1's complement form to the more convenient 2's complement form. Carry input line 323 of full adder 376 receives through OR circuit 322 a signal from increment +1 line 120 when the sum of the operands is to be incremented by one. OR circuits 321 and 323 both receive a signal from the increment +2 line 120 during incrementing of the sum by two.

The sum outputs S1, S2, S3 and S4 from full adders 376, 377, 378 and 379 are supplied to cable 119.

*4-Bit, 4-Input Adder.*—FIGURE 3*b* shows a multiple-input adder for combining four 4-bit operands A, B, C and D to form a 4-bit sum S. The extension of the principles of the adder of FIGURE 3*a* to four inputs gives substantial advantages: (a) Addition of four operands, (b) addition of three operands together with subtraction of one operand, (c) incrementing by three during addition, and (d) incrementing by either two or one during either addition or subtraction. Full adders are designated according to their matrix position, for example the full adder in the third bit position of the first level is F13.

Operands A, B and C are connected directly from cables 115, 116 and 117 to the first level full adders 329, 330, 331 and 332. Operand D is connected from cable 375 to the second level full adders 352, 353, 354 and 355 indirectly through Exclusive OR circuits 336, 337, 338 and 339. The Exclusive OR circuits form the 1's complement (later converted to the 2's complement) of the operand D when there is a 1-bit on subtract D line 121. Obviously, placement of the Exclusive OR circuits is a matter of choice since such circuits could be provided in any, or all, of the other operand lines.

The second level full adders 352, 353, 354 and 355, in addition to operand D, receive sum outputs from corresponding first level adders on lines 340, 341, 342 and 343 and from carry outputs of full adders assigned to adjacent bit positions on lines 333, 334 and 335. A third level of full adders 364, 365, 366 and 367 combines the corresponding sums on lines 360, 361, 362 and 363 and adjacent carries on lines 357, 358 and 359 from the second level full adders while rippling interposition carries on lines 369, 370 and 371. Carry outputs on lines 372, 373 and 374 are not used in this example.

With a 1-bit on the subtract D line 121, the Exclusive OR circuits 336, 337, 338 and 339 invert the operand D and OR circuit 349 supplies a 1-bit to full adder 352 carry input line 348, thus synthesizing the 2's complement of operand D. During either addition or subtraction operations, a 1-bit on the increment +1 line 120 to OR circuit 351 applies a 1-bit signal on full adder 364 carry input line 368 increasing the sum of the operands by one. OR circuits 350 and 351 transfer 1-bits from the increment +2 line 120 to full adder 364 inputs 356 and 368 increasing the sum by two. Signals on the increment +3 line 120 are applied via OR circuits 349, 350 and 351 to full adder 352 carry input line 348 and to full adder 364 input lines 356 and 368 to increase the sum by three during addition operations.

All results appearing on sum S outputs S1, S2, S3 and S4 from full adders 364, 365, 366 and 367 are placed on cable 119.

*M-Bit, N-Input Adder.*—Referring now to FIGURE 3*c*, the principle of the adder 18 illustrated in FIGURES 3*a* and 3*b* is applied to a general example adding N operands each having M bits. An operand-designating letter and a bit number identify each operand position, there being N operands A, B, C, D, etc. through N, each having M bits 1, 2, 3, 4, etc. through M. For example, operand C comprises bit positions C1, C2, C3, C4, etc. through CM and the last operand N comprises bits N1, N2, N3, N4, etc. through NM. Operand A through N are supplied to the adder 18 on FIGURE 1*a* cabled lines 115, 116, 117, etc. through 118 respectively, while output sum bits S1 through SM are placed on FIGURE 1*a* cable 119.

The full adders form a matrix having $N-1$ levels and M positions in each level, a level (horizontal row) number and a position (vertical column) number identifying each typical full adder shown. For instance, full adder F43 is in the third bit position of the fourth level.

Each full adder in the first level receives three operands and each full adder in each succeeding level, except the last, receives one additional operand. Individual full adders in each level below the first level also receive sum inputs from the sum output of the full adders in corresponding bit positions of the preceding level and carry inputs from the carry outputs of the full adders in adjacent lower order bit positions of the preceding level. In the last level, full adder carry outputs are chained to adjacent higher order full adder carry inputs to ripple carries. The sum is provided at the outputs of the last level.

Output lines 386, 387, 388, 389, 390, etc. (not shown), 391 and 392, representing carry outputs from the last bit positions of each level, may or may not be used as desired. Input lines 380, 381, 382, 383, etc. (not shown) 384 and 385, representing carry inputs to the first bit positions of each level, except the first, may or may not be used for incrementing on 2's complement subtraction as previously described with reference to FIGURES 3*a* and 3*b*. For example, the sum may be incremented by four if 1-bits are supplied on lines 380, 381, 382 and 383. Subtraction of any, or all ($n-1$), of the operands by inserting Exclusive OR circuits in the adder 18 input lines in the manner described with reference to FIGURES 3*a* and 3*b* is obvious; many combinations of addition, subtraction and incrementation being therefore conveniently obtainable without material modification of the circuit shown in FIGURE 3*c*.

EXAMPLE OF OPERATION

Referring to all the figures, and particularly to the illustrative multiple-input adder 18 embodiment of FIGURE 3*a*, operation of the invention will now be described for both addition and subtraction. It will be assumed that: an instruction having an address part value 0011 (three) is initially present in the instruction register 11, the index register 15 contains the value 0111 (seven), the relocation register 16 contains the value 0010 (two) and that the rest of the modifying registers are not used (that is, the register designation part 125 of the instruction specifies only the index register and the relocation register). Prior to accessing of data or any processing operations in accordance with the instruction in the instruction register 11, the contents (0111) of the index register 15 and the contents (0010) of the relocation register 16 are combined with the instruction address part (0011) to form an effective address for use in accessing memory 13. Assuming that the increment lines 120 have 0-bits on them (though for purposes of illustration the effect of a 1-bit will be briefly shown), the effective address will for addition be 1100 (twelve) while, if the relocation input (0010) is subtracted, the effective address will be 1000 (eight).

Referring to FIGURES 1*a* and 1*c*, during the first part of the memory cycle, signal *ir* operates gate 19 to transfer the instruction address part (0011) to the memory address register 12. During the same part of the cycle, signals *mar*, *ixr* and *rr* operate the gates 127, 111 and 112 to send the instruction address part (0011) to multiple input adder 18 input A via cable 115, the index quantity (0111) to input B via cable 116 and the relocation quantity (0010) to input C via cable 117. During the balance of the first part and during the entire second part of the memory cycle, the multiple input adder 18 operates on the inputs A, B and C to form an effective address.

*Addition* ($A+B+C$).—During addition, there are 0-bits on subtract line 121 and increment line 120. Referring to FIGURE 3*a*, operand A having the value 0011 is supplied to corresponding carry input lines of full adders 309, 310, 311 and 312 and operand B having the value 0111 is applied to corresponding ones of one set of operand inputs of the same full adders. Operand C having the value 0010 is applied to corresponding ones of the remaining operand inputs of these full adders through Exclusive OR circuits 31, 32, 33 and 34 which pass the operand C without change because there is a 0-bit on subtract C line 121. In the first level, following the rules of the FIGURE 2*b* table, full adder 309 has a sum output 0 and a carry output of 1, full adder 310 has a sum output of 1 and a carry output of 1, full adder 311 has a sum output of 1 and a carry output of 0 and full adder 312 has a sum output of 0. Second level full adders 376, 377, 378 and 379 therefore receive the binary numbers 0110, on lines 313, 314, 315 and 316, and 0110, on lines 320, 317, 318 and 319, which together with ripple carries (from full adders 377 and 378), form a final sum 1100 on lines S1, S2, S3 and S4 to cable 119. Referring again to FIGURE 1*a*, the effective address sum (1100) on cable 119 is toward the end of the second part of the memory cycle passed through a gate 114 by a signal *a* into the memory address register 12. At the beginning of the third part of the cycle, signal *mem* transfers the effective address (1100) from the memory address register 12 through the gate 110 to the memory 13 to address a data word at location 1100. The data word is read into the memory buffer register 14 during parts 3 and 4 of the cycle (for processing in accordance with the instruction operation part) and then regenerated into memory M location 1100 during parts 5 through 8.

If a 1-bit had been applied to the increment +2 line 120, 1-bits would be entered into the operand input line 320 and carry in line 323 of full adder 376 causing it to emit a sum of 0 and a carry of 1. The ripple carry from full adder 376 to full adder 377 would then cause full adder 377 to emit a sum bit of one and (as previously) a carry output of one. Thus the sum present on cable 119 would be 1110 (fourteen) instead of 1100 (twelve).

*Subtraction* ($A+B-C$).—Referring again to FIGURE 1*a*, conditions are the same as previously described for addition except that there is now a 1-bit on the subtract C line 121. Therefore in FIGURE 3*a*, though operands A and B are supplied unchanged to first level full adders 309, 310, 311 and 312, operand C (having the value 0010) is 1's complement inverted (to the value 1101) by Exclusive OR circuits 31, 32, 33 and 34 prior to transfer to the first level full adders. As a result, the full adder 309 emits a 1-bit sum and a 1-bit carry output, the full adder 310 emits a 0-bit sum and a 1-bit carry, the full adder 311 emits a 0-bit sum and a 1-bit carry and the full adder 312 emits a 1-bit sum. The second level full adders 376, 377, 378 and 379 utilize this information and a 1-bit from the subtract C line 121 (synthesizing the 2's complement of operand C) to add 1001 on lines 313, 314, 315 and 316 and 1111 on lines 320, 317, 318 and 319 to form the output sum 1000 (plus a 1-bit high order carry on line 328, which is ignored in 2's complement arithmetic) on cable 119. The sum 1000 (eight) is used in the same manner as the sum formed during addition as previously described.

If there had been a 1-bit on the increment +1 line, a 1-bit input carry would have been supplied to full adder 376 via line 323 causing it to emit a 1-bit sum and (as before) a 1-bit carry. Therefore, the sum would instead be 1001 (nine) instead of 1000 (eight).

There has been described multiple-input memory accessing apparatus wherein a multiple-input adder performs a plurality of additions during a fixed period available for addressing a memory, thus overcoming the inefficiencies and expenses of prior art devices. The novel multiple-input adder comprises a matrix of full adder circuits which performs time-wasting ripple carry operations only once regardless of the number of operands provided, while, additionally simplifying subtraction and incrementing operations.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Memory address modification apparatus comprising:

an addressable memory;

a number of multi-bit word sources, each source having one output for each bit of a multi-bit word, for supplying operands to be combined with each other for the purpose of addressing said memory;

a matrix of full adders, each full adder having first, second and third inputs and sum and carry outputs;

said matrix comprising a number of levels equal to said number of multi-bit word sources minus one, each of said levels having a number of full adders equal to the number of bits in the largest of said operands;

first means connecting the outputs of three of said multi-bit word sources to the inputs of corresponding full adders in a first level of said matrix;

second means connecting the outputs from each remaining one of said multi-bit word sources to the first inputs of corresponding full adders of a different level of said matrix so that each level except a last level and said first level of said matrix receives the output from one and only one of said sources of multi-bit words;

third means connecting the sum output of each adder in each level except said last level to a second input of the corresponding adder in the succeeding level so that the sum output of the $m^{th}$ adder in the $n^{th}$ level is connected to a second input of the $m^{th}$ adder in the $(n+1)^{st}$ level;

fourth means connecting the carry output of each adder except the highest order adder of each level except said last level to a third input of the next higher order adder in the succeeding level so that the carry output of the $m^{th}$ adder in the $n^{th}$ level is connected to the third input of the $(m+1)^{st}$ adder in the $(n+1)^{st}$ level;

fifth means connecting the carry output of each adder of said last level except the highest order adder of said last level to the first input of the next higher order adder in said last level so that the carry output of the $m^{th}$ adder of the last level is connected to the first input of the $(m+1)^{st}$ adder of the last level;

a source of incrementing signals;

means connecting said source of incrementing signals to the third input of the lowest order adder in each level except said first level for incrementing address words; and means connecting the sum output of each adder in said last level to said addressable memory for supplying modified address words that have been formed as a function of said operands and increments.

2. Memory address modification apparatus in accordance with claim 1, further including:

complementing means inserted between one of said sources of multi-bit word and a corresponding level of said matrix;

a source of subtraction signals;

means connecting said source of subtraction signals to said complementing means to form the 1's complement of a selected one of said operands; and means connecting said source of subtraction signals to the third input of the lowest order adder in any level except said first level to simulate the 2's complement of said selected operand;

whereby said selected operand will be subtracted from the sum of the remainder of said operands.

References Cited by the Examiner

UNITED STATES PATENTS

| | | | |
|---|---|---|---|
| 2,879,001 | 3/1959 | Weinberger et al. | 235—175 |
| 2,914,248 | 11/1959 | Ross et al. | 235—157 |
| 2,916,210 | 12/1959 | Selmer | 235—157 |
| 3,015,441 | 1/1962 | Rent et al. | 235—157 |
| 3,015,443 | 1/1962 | Miller | 235—164 |
| 3,023,962 | 3/1962 | Stafford | 235—175 |
| 3,036,773 | 5/1962 | Brown | 235—157 |
| 3,098,153 | 7/1963 | Heijn | 235—175 |
| 3,115,574 | 12/1963 | Paul et al. | 235—164 |
| 3,163,749 | 12/1964 | Roth et al. | 235—164 |

OTHER REFERENCES

Beckman, F. S. et al.: Developments in the Logical Organization of Computer Arithmetic and Control Units, in Proceedings of the I.R.E., 49: (1), January 1961, pp. 53–56 relied on.

MacSorley, O. L.: High-Speed Arithmetic in Binary Computers, in Proceedings of the I.R.E., 49 (1), January 1961, p. 6791. TK 5700 I7.

ROBERT C. BAILEY, *Primary Examiner.*

MALCOLM A. MORRISON, *Examiner.*

J. P. VANDENBURG, *Assistant Examiner.*